(12) United States Patent
Naitou (10) Patent No.: US 7,995,287 B2
(45) Date of Patent: Aug. 9, 2011

(54) LENS BARREL AND IMAGING APPARATUS

(75) Inventor: Tsutomu Naitou, Kanagawa (JP)

(73) Assignee: Sony Corporation (JP)

( * ) Notice: Subject to any disclaimer, the term of this patent is extended or adjusted under 35 U.S.C. 154(b) by 88 days.

(21) Appl. No.: 12/590,066

(22) Filed: Nov. 2, 2009

(65) Prior Publication Data

US 2010/0134902 A1 Jun. 3, 2010

(30) Foreign Application Priority Data

Nov. 28, 2008 (JP) ................................ P2008-305301

(51) Int. Cl.
*G02B 15/14* (2006.01)
(52) U.S. Cl. ........................................ 359/694; 359/830
(58) Field of Classification Search ........... 359/694–704
See application file for complete search history.

(56) References Cited

U.S. PATENT DOCUMENTS

| 2005/0094992 A1* | 5/2005 | Hamasaki et al. | 396/144 |
| 2007/0297785 A1* | 12/2007 | Kogure et al. | 396/90 |

FOREIGN PATENT DOCUMENTS

| JP | 54-017728 A | 2/1979 |
| JP | 58017428 A | 2/1983 |
| JP | 59-094709 A | 5/1984 |
| JP | 2000089081 A | 3/2000 |
| JP | 2000206401 A | 7/2000 |
| JP | 2002318339 A | 10/2002 |
| JP | 2006-259130 A | 9/2006 |
| JP | 2007100773 A | 4/2007 |
| JP | 2007304418 A | 11/2007 |

OTHER PUBLICATIONS

Office Action from Japanese Application No. 2008-305301, dated Sep. 7, 2010.
Office Action from Japanese Application No. 2008-305301, dated Jan. 4, 2011.

* cited by examiner

*Primary Examiner* — Ricky L Mack
*Assistant Examiner* — James C Jones
(74) *Attorney, Agent, or Firm* — Lerner, David, Littenberg, Krumholz & Mentlik, LLP (57) ABSTRACT

A lens barrel includes: a lens holding frame holding a lens; a barrel body housing the lens holding frame; motion conversion means for converting rotary motion of the lens holding frame into reciprocating motion along the optical axis of the lens; a manual ring provided on the outer side of the barrel body and rotating around the optical axis; a coreless stepper motor provided on the outer side of the barrel body and rotating around the optical axis; rollers provided between the manual ring and the stepper motor, and rotating in synchronization with the rotation of the manual ring and the stepper motor; motor rotation preventing means for preventing the stepper motor from rotating when the rollers transfer the rotation of the manual ring; an intermediate ring rotating around the optical axis; and a transfer unit transferring the rotary motion of the intermediate ring to the lens holding frame.

10 Claims, 6 Drawing Sheets

LENS BARREL AND IMAGING APPARATUS

CROSS-REFERENCE TO RELATED APPLICATION

The present application claims priority from Japanese Patent Application No. JP 2008-305301 filed in the Japanese Patent Office on Nov. 28, 2008, the entire content of which is incorporated herein by reference.

BACKGROUND OF THE INVENTION

1. Field of the Invention

The present invention relates to a lens barrel provided in an imaging apparatus (such as a digital still camera and a digital video camcorder), a lens barrel used in an exchangeable lens, and an imaging apparatus. The present invention particularly relates to a technology for achieving automatic functions using a coreless stepper motor and manual functions that allow manual operation.

2. Description of the Related Art

There has been a camera including a lens barrel using an actuator to drive a lens holding frame that holds a lens. To achieve automatic functions (such as an autofocus function and an automatic zoom function) of the camera, a DC motor, an ultrasonic motor, or any other suitable motor is used as the actuator to drive the lens holding frame.

Although a DC motor is characterized by its inexpensiveness, a gear-based reduction mechanism is typically required to provide a driving torque necessary to move the lens along the optical axis thereof. The gear-based reduction mechanism produces gear noise when the autofocus function or the automatic zoom function is performed, disadvantageously resulting in degradation in quality of the lens barrel. Further, when a DC motor is used, a photo-interrupter or any other suitable position detection sensor is necessary to stop the motion of the lens with precision, which is typically required to achieve the optical performance of the lens barrel. Moreover, incorporating the DC motor and the reduction mechanism in the lens barrel may result in not only a rugged shape and hence unpleasant exterior, but also increase in size of the lens barrel.

On the other hand, when an ultrasonic motor is used, the degradation in quality due to driving noise (gear noise) will not occur because an ultrasonic motor is driven at a driving frequency outside the human audible range. However, since the conditions under which an ultrasonic motor is assembled in a lens barrel tend to vary, unusual noise disadvantageously tends to occur when the ultrasonic motor is driven. Further, since drive control of an ultrasonic motor involves considering the relationship between the nonlinear driving frequency and the voltage, a lens barrel using an ultrasonic motor has a variety of problems, such as increase in the number of steps necessary for design, repair, and restoration, resulting in increase in cost.

To address the above problems, an electromagnetic conversion-type coreless motor has been used, instead of a DC motor or an ultrasonic motor. Specifically, in this technology, a cylindrical field magnet is secured around the outer circumferential surface of a movable lens barrel that rotates relative to a fixed lens barrel, and an armature coil is secured in the fixed lens barrel, which faces the field magnet. A magnetic sensing element is disposed on a conductor that contributes to the torque produced by the armature coil, which faces the field magnet (See JP-A-59-94709, for example).

In recent years, consumers have placed greater importance, when it comes to a higher-performance zoom lens, on whether or not the lens has manual functions. In particular, a lens barrel used in an exchangeable lens needs to allow a photographing user to arbitrarily choose between automatic functions (such as an autofocus function and an automatic zoom function) and manual functions (such as a manual focus function and a manual zoom function).

In another known technology, the operation mode is switched between an autofocus operation and a manual focus operation. Specifically, the technology relates to a lens barrel including a vibration wave motor that produces a driving force for the autofocus operation, a gear train that transfers the driving force produced by the vibration wave motor, and a gear member that switches the operation mode between the autofocus operation and the manual focus operation (see JP-A-2006-259130, for example).

SUMMARY OF THE INVENTION

In the technology described in JP-A-59-94709, since the electromagnetic conversion-type coreless motor can directly drive the lens holding frame, no problem of noise, unusual sound, or any other annoying sound due to a DC motor or an ultrasonic motor will occur. However, to precisely control the position where the electromagnetic conversion-type coreless motor is stopped, the dedicated magnetic sensing element is necessary. Further, after the coreless motor is stopped, the position where the coreless motor has been stopped needs to be maintained in a non-energized state or a weakly energized state in order to reduce power consumption, but JP-A-59-94709 described above does not disclose at all how to hold the stop position (how to restrict the rotation of the coreless motor). If the stop position is not held, an external force (external impact, for example) may shift the lens holding frame after an image has been brought into focus, and the image disadvantageously goes out of focus. Further, JP-A-59-94709 does not describe how to switch the operation mode between the autofocus operation and the manual focus operation.

On the other hand, the technology described in JP-A-2006-259130 allows a photographing user to switch the operation mode between the autofocus operation and the manual focus operation. However, since a vibration wave motor is used to carry out the autofocus operation, the driving-related unusual noise problem and the cost problem remain unsolved. Further, since a gear train is used to transfer the driving force and a gear member is used to switch the operation mode between the two operations, the driving noise (gear noise) problem also remains unsolved. Moreover, JP-A-2006-259130 does not at all disclose how to hold the stop position in a non-energized state or a weakly energized state.

It is therefore desirable to provide a lens barrel and an imaging apparatus that are inexpensive, produce a small amount of noise, and achieve both automatic functions and manual functions.

According to an embodiment the invention, there is provided a lens barrel including a lens holding frame holding a lens, a barrel body housing the lens holding frame, motion conversion means for converting rotary motion of the lens holding frame into reciprocating motion along the optical axis of the lens, the motion conversion means provided between the lens holding frame and the barrel body, a manual ring provided on the outer side of the barrel body and rotating around the optical axis of the lens when manually rotated, a coreless stepper motor provided on the outer side of the barrel body and rotating around the optical axis of the lens, rollers provided between the manual ring and the stepper motor, the rollers rotating not only in synchronization with the rotation of the manual ring but also in synchronization with the rotation of the stepper motor, motor rotation preventing means for preventing the stepper motor from rotating when the rollers transfer the rotation of the manual ring, an intermediate ring rotating around the optical axis of the lens as the rollers rotate, and a transfer unit transferring the rotary motion of the intermediate ring to the lens holding frame.

According to another embodiment the invention, there is provided a lens barrel including a lens holding frame holding a lens, a barrel body housing the lens holding frame, motion conversion means for converting rotary motion of the lens holding frame into reciprocating motion along the optical axis of the lens, the motion conversion means provided between the lens holding frame and the barrel body, a manual ring provided on the outer side of the barrel body and rotating around the optical axis of the lens when manually rotated, a coreless stepper motor provided on the outer side of the barrel body and rotating around the optical axis of the lens, rollers provided between the manual ring and the stepper motor, the rollers rotating not only in synchronization with the rotation of the manual ring but also in synchronization with the rotation of the stepper motor, an intermediate ring rotating around the optical axis of the lens as the rollers rotate, and a transfer unit transferring the rotary motion of the intermediate ring to the lens holding frame.

According to still another embodiment the invention, there is provided an imaging apparatus including a lens capturing a image, an imaging device disposed in the optical axis of the lens, a lens holding frame holding the lens, a barrel body housing the lens holding frame, motion conversion means for converting rotary motion of the lens holding frame into reciprocating motion along the optical axis of the lens, the motion conversion means provided between the lens holding frame and the barrel body, a manual ring provided on the outer side of the barrel body and rotating around the optical axis of the lens when manually rotated, a coreless stepper motor provided on the outer side of the barrel body and rotating around the optical axis of the lens, rollers provided between the manual ring and the stepper motor, the rollers rotating not only in synchronization with the rotation of the manual ring but also in synchronization with the rotation of the stepper motor, motor rotation preventing means for preventing the stepper motor from rotating when the rollers transfer the rotation of the manual ring, an intermediate ring rotating around the optical axis of the lens as the rollers rotate, and a transfer unit transferring the rotary motion of the intermediate ring to the lens holding frame.

(Operation)

In the embodiments of the invention described above, a coreless stepper motor is provided. The rollers rotate in synchronization with the rotation of the stepper motor, and the intermediate ring rotates as the rollers are rotated. The rotary motion of the intermediate ring is transferred to the lens holding frame via the transfer unit. The configuration described above can drive the lens holding frame to move the lens using neither a DC motor or an ultrasonic motor nor a gear-based transfer mechanism.

Further, in the embodiments of the invention described above, a manual ring that is manually rotated is provided. The rollers rotate in synchronization with the rotation of the manual ring, and the intermediate ring rotates as the rollers rotate. The rotation of the manual ring is thus transferred to the lens holding frame. Therefore, the lens can therefore be moved not only by an electrically powered operation but also by a manual operation.

According to the embodiments of the invention, since the coreless stepper motor, the rollers rotating in synchronization with the rotation of the stepper motor, and the intermediate ring rotating as the rollers rotate are used to drive the lens holding frame, an inexpensive, low-noise lens barrel and imaging apparatus can be provided. Further, since the rollers rotates not only in synchronization with the electrically powered rotation of the stepper motor but also in synchronization with the manual rotation of the manual ring, electrically powered automatic functions and manually operated functions are both achieved.

DESCRIPTION OF THE PREFERRED EMBODIMENTS

The best mode for carrying out the invention (hereinafter referred to as an "embodiment") will be described below with reference to the drawings.

Here, it is assumed that an imaging apparatus in each of the following embodiments of the invention is a digital single lens reflex camera. It is also assumed that a lens barrel in each of the following embodiments of the invention is an exchangeable lens barrel 10 and an exchangeable lens barrel 50 used in an exchangeable lens of the digital single lens reflex camera. The description will be made in the following order:

1. First embodiment (Exchangeable lens barrel 10: an example in which motor rotation preventing means is provided)

2. Second embodiment (Exchangeable lens barrel 50: an example in which no motor rotation preventing means is provided)

First Embodiment

[Example of Cross Section of Exchangeable Lens Barrel]

Figure 1:
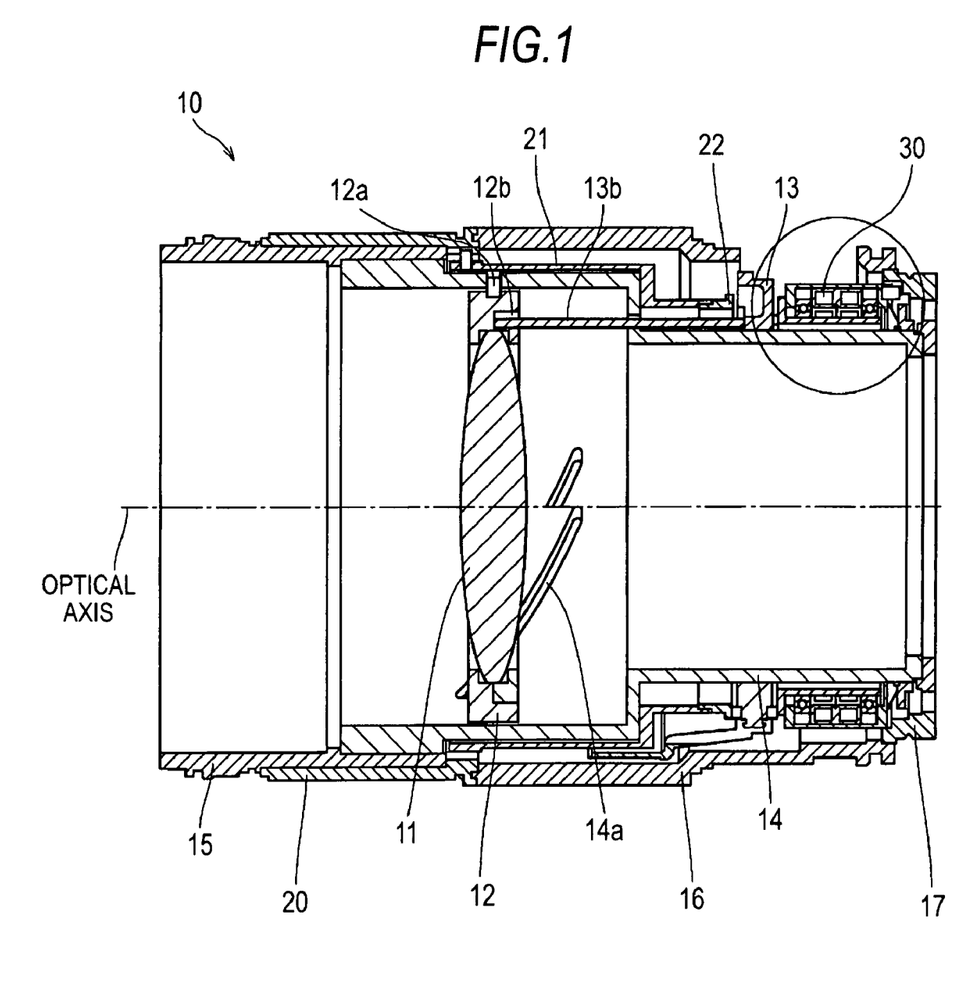
FIG. 1 is a cross-sectional view of an exchangeable lens barrel taken along the optical axis, as a lens barrel according to one embodiment of the invention.

FIG. 1 is a cross-sectional view of an exchangeable lens barrel 10 taken along the optical axis, as a lens barrel according to an embodiment of the invention.

Figure 2:
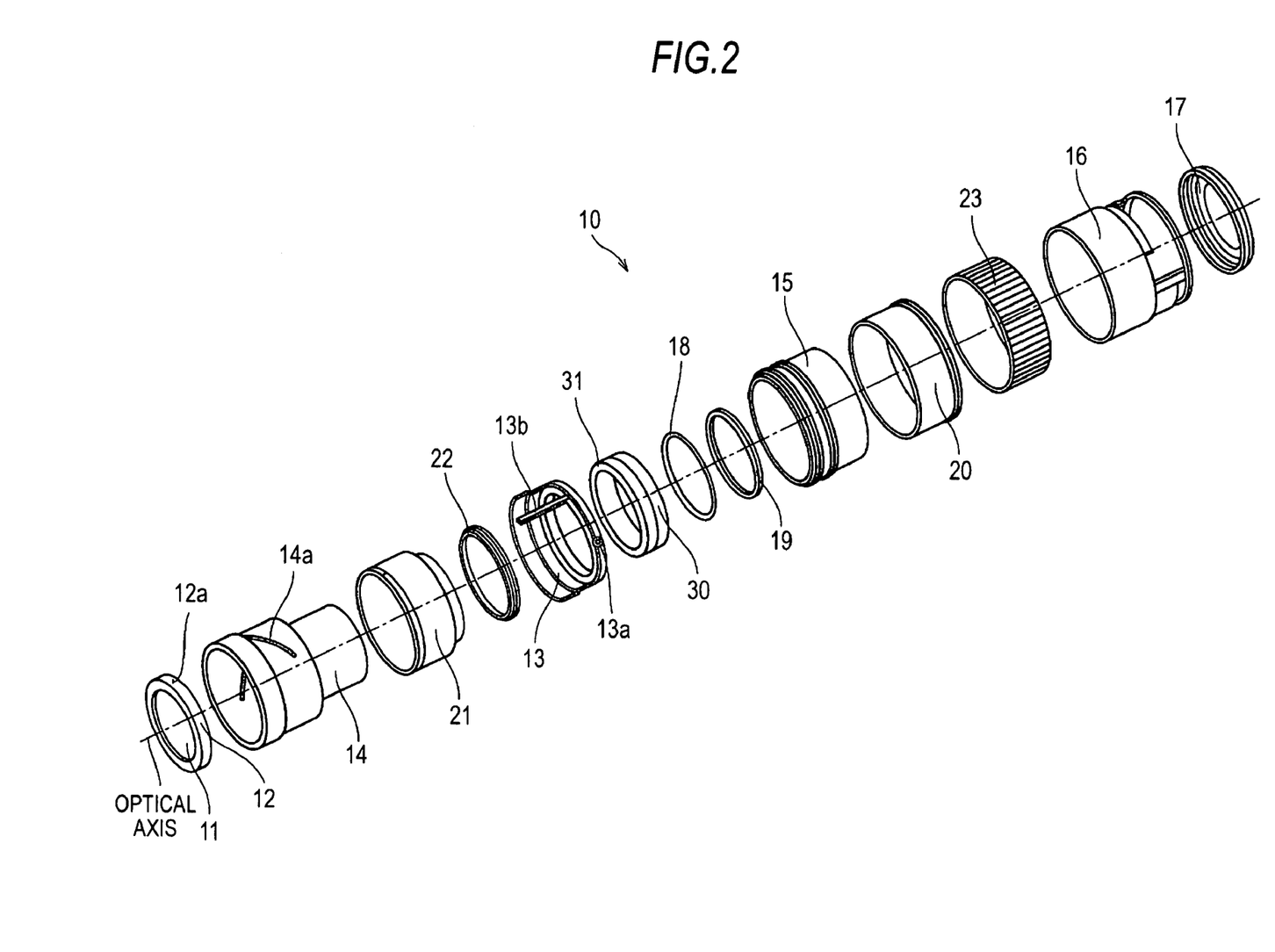
FIG. 2 is an exploded perspective view of the exchangeable lens barrel shown in FIG. 1.

FIG. 2 is an exploded perspective view of the exchangeable lens barrel 10 shown in FIG. 1.

As shown in FIGS. 1 and 2, the exchangeable lens barrel 10 of the first embodiment includes a lens holding frame 12 that holds a lens 11 (a focus lens in the first embodiment), a manual ring 20 that is used to rotate the lens holding frame 12 manually, a coreless stepper motor 30 that electrically drives the lens holding frame 12, and a differential ring 13 (corresponding to the intermediate ring in the claims) that transfers the rotational force produced by the manual ring and the driving force produced by the stepper motor 30 to the lens holding frame 12.

The lens holding frame 12, the manual ring 20, the stepper motor 30, and the differential ring 13 are arranged serially in such a way that the central axes thereof coincide with the optical axis of the lens 11. These components are incorporated in a base formed of a fixed barrel 14 (that forms part of the barrel body in the claims) and a front barrel 15 (that forms another part of the barrel body in the claims) provided in front of the fixed barrel 14. A cover 16 is provided on the outer side of the fixed barrel 14 and fixed thereto by using a fastening ring 17 provided behind the fixed barrel 14. Further, the rear side of the fixed barrel 14 is formed in such a way that it can be attached and detached to and from a digital single lens reflex camera. Therefore, when the exchangeable lens barrel 10 is attached to a digital single lens reflex camera, an imaging device disposed in the optical axis of the lens 11 can capture a subject image incident through the lens 11.

The lens holding frame 12 is housed in the cylindrical fixed barrel 14, and motion conversion means for converting the rotary motion of the lens holding frame 12 into the reciprocating motion along the optical axis of the lens 11 is provided between the lens holding frame 12 and the fixed barrel 14. The motion conversion means in the first embodiment includes a helicoid 14a formed in the cylindrical surface of the fixed barrel 14 and a cam pin 12a protruding from the outer circumferential surface of the lens holding frame 12. Specifically, when the cam pin 12a fits in and engages the helicoid 14a, the lens holding frame 12 is restricted in a plane perpendicular to the optical axis. When the lens holding frame 12 is rotated, the cam pin 12a is guided through the helicoid 14a and moved in the optical axis direction. Therefore, the rotary motion of the lens holding frame 12 is converted into the reciprocating motion in the optical axis direction, and the lens holding frame 12 is moved in the optical axis direction while being rotated. As a result, focus operation is carried out in the exchangeable lens barrel 10.

The focus operation described above is carried out by manually rotating the manual ring 20 or electrically rotating the stepper motor 30. Specifically, the manual ring provided on the outer side of the front barrel 15 is manually rotated around the optical axis of the lens 11. A manual ring coupling annulus 21 and a transfer ring 22 are provided on the outer side of the fixed barrel 14 in order to transfer the rotational force produced by the manual ring 20 when it is manually operated. A rubber ring 23 (see FIG. 2) is provided on the outer circumferential surface of the manual ring 20 in order to make the manual rotation operation easy.

On the other hand, the coreless stepper motor 30 is provided on the outer side of the fixed barrel 14, and driven and rotated around the optical axis of the lens 11. A synchronization ring 31 (see FIG. 2) is provided to transfer the driving force produced by the stepper motor 30. The differential ring 13 is provided between the transfer ring 22 used with the manual ring 20 and the synchronization ring 31 used with the stepper motor 30.

The differential ring 13 includes cylindrical rollers 13a, each of the rollers having an axis around which it rotates and which is perpendicular to the optical axis, as shown in FIG. 2. The number of roller 13a is three and they are disposed along the circumference of the differential ring 13 at equal spacings. The circumferential surface of each of the rollers 13a abuts an end surface of the transfer ring 22. Therefore, when the manual ring 20 is manually rotated, the manual ring coupling annulus 21 and the transfer ring 22 transfer the rotation of the manual ring 20 to the rollers 13a, which are then rotated in synchronization therewith.

The circumferential surface of each of the rollers 13a also abuts the end surface of the synchronization ring 31 that faces the transfer ring 22. Therefore, when the stepper motor 30 is driven and rotated, the synchronization ring 31 transfers the rotation of the stepper motor 30 to the rollers 13a, which are then rotated in synchronization therewith. The differential ring 13 is then rotated around the optical axis of the lens 11 as the rollers 13a are rotated. The angle of rotation of the differential ring 13 is reduced to half the angle of rotation of the manual ring 20 (transfer ring 22) and the stepper motor 30 (synchronization ring 31).

A synchronization key 13b (corresponding to the transfer means in the claims) protrudes from the differential ring 13, the synchronization key 13b transferring the rotary motion of the differential ring 13 to the lens holding frame 12. The synchronization key 13b engages a key groove 12b (see FIG. 1) formed in the lens holding frame 12.

Therefore, in the exchangeable lens barrel 10 of the first embodiment, the manual rotation of the manual ring 20 can rotate the lens holding frame 12 via the synchronization key 13b of the differential ring 13. Since the cam pin 12a and the helicoid 14a convert the rotary motion of the lens holding frame 12 into the reciprocating motion in the optical axis direction, manual focus operation can be carried out. On the other hand, when the coreless stepper motor 30 is driven and rotated, autofocus operation can be similarly carried out via the differential ring 13 and other components.

[Example of Cross Section of Coreless Stepper Motor]

Figure 3:
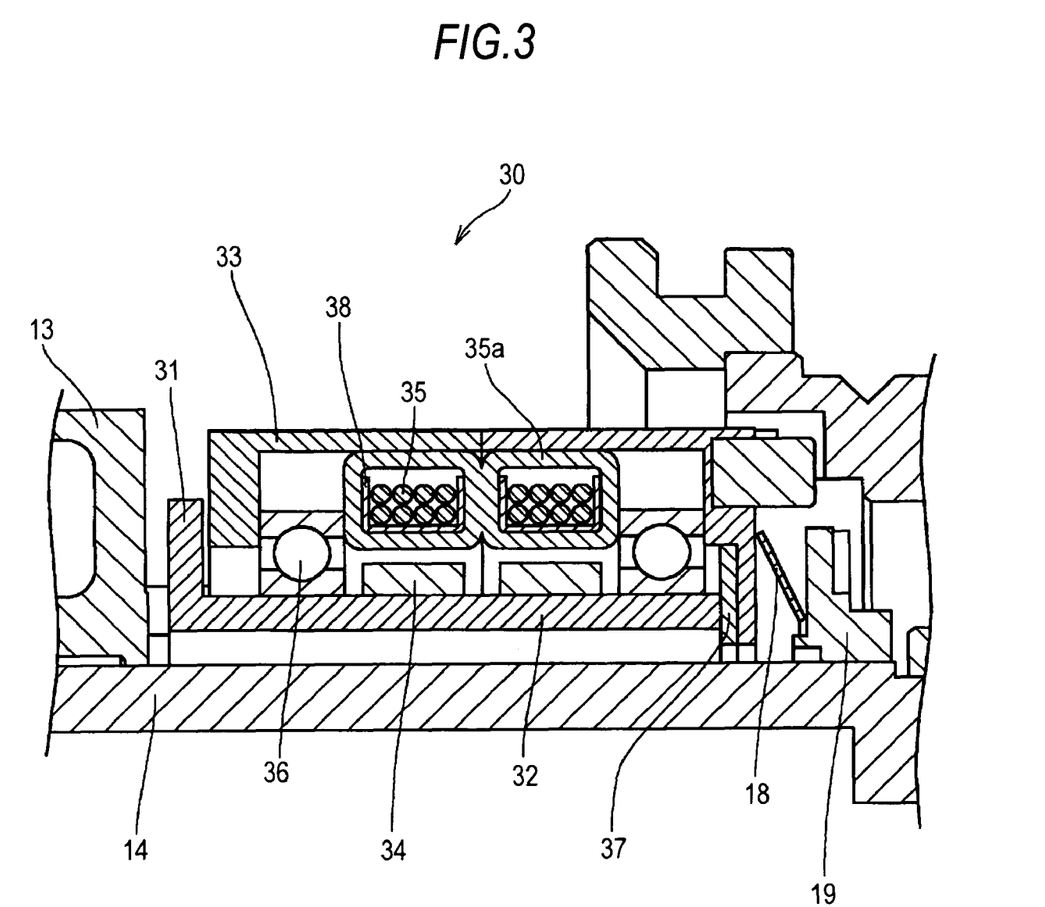
FIG. 3 is a cross-sectional view of a stepper motor in the exchangeable lens barrel shown in FIG. 1, taken along the optical axis.

FIG. 3 is a cross-sectional view of the stepper motor 30 in the exchangeable lens barrel 10 shown in FIG. 1, taken along the optical axis.

As shown in FIG. 3, the stepper motor 30, which is provided on the outer side of the fixed barrel 14, has a coreless structure. The stepper motor 30 includes a rotor 32 that forms an inner hull of the stepper motor 30 and rotates integrally with the synchronization ring 31 and a motor housing 33 that forms an outer hull of the stepper motor 30 and does not rotate because it is fixed to the fixed barrel 14.

A magnet 34 is fixed to the outer side of the rotor 32, and a coil 35 is wound around a coil holder 38 made of a synthetic resin inside a stator 35a in the motor housing 33. Further, ball bearings 36 (corresponding to the rotary bearing in the claims) are disposed between the rotor 32 and the stator 35a. The ball bearings 36 keep the distance between the magnets 34 and the stator 35a constant in the stepper motor 30.

The role of the ball bearings 36 will now be described. A magnetic attraction force is constantly produced between the magnet 34 and the stator 35a. When the center of the magnet 34 perfectly coincides with the center of the coil 35, the magnetic attraction force is canceled and the rotor 32 will not be attracted to the stator 35a. However, variation that typically occurs in an assembling step disadvantageously produces a slight shift between the center of the magnet 34 and the center of the stator 35a. It is significantly difficult to control the assembling step not to cause any shift. If no measure is taken, the rotor 32 is attracted to the stator 35a, and an attraction force is produced in the direction of the radius of rotation, resulting in increase in torque loss in the stepper motor 30. To reduce the torque loss, the ball bearings 36 are disposed so that the center of the magnet 34 coincides with the center of the stator 35a. It is noted that the rotary bearings in the claims are not limited to the ball bearings 36, but may be roller bearings or any other suitable bearings.

As described above, the torque loss in the stepper motor 30 is reduced by providing the ball bearings 36, and the driving force (rotational force of the rotor 32) of the stepper motor 30 is efficiently transferred to the differential ring 13 via the synchronization ring 31. The configuration in the first embodiment is not necessarily employed, but the stator may be fixed inside the rotor 32 and the magnet may be fixed outside the stator. In this case, the rotating rotor corresponds to the outer hull of the stepper motor 30, and the non-rotating stator corresponds to the inner hull of the stepper motor 30.

A sliding ring 37 (corresponding to the motor rotation preventing means in the claims) made of a fluororesin (polytetrafluoroethylene, for example) abuts the end surface of the rotor 32 on the side that is opposite the differential ring 13. The sliding ring 37 is provided on the outer side of the fixed barrel 14 with one end surface being in surface contact with the end surface of the rotor 32 and the other end surface being in surface contact with an end surface of the motor housing 33. A pressurizing spring 18 (a wave spring in the first embodiment) that presses the sliding ring 37 against the rotor 32 is provided so that the sliding ring 37 exerts a predetermined magnitude of frictional force on the rotor 32. Further, a pressure adjusting ring 19 is provided to adjust the pressing force of the pressurizing spring 18. The pressurizing spring 18 is not limited to a wave spring but may be a coiled spring or any other suitable spring.

Therefore, the pressing force of the pressurizing spring 18 acts on the sliding ring 37 via the end surface of the motor housing 33. A frictional force is produced between the rotor 32 and the sliding ring 37, and the frictional force prevents the rotor 32 from rotating. The magnitude of the frictional force acting on the rotor 32 is adjusted by the pressure adjusting ring 19. Specifically, the inner circumferential surface of the pressure adjusting ring 19 is threaded, and the inner thread surface engages a threaded outer circumferential surface of the fixed barrel 14. In this configuration, adjusting as appropriate how much the pressure adjusting ring 19 is screwed in changes how much the pressurizing spring 18 is bent (the magnitude of the pressing force), whereby the frictional force between the rotor 32 and the sliding ring 37 is adjusted.

The sliding ring 37 prevents the rotor 32 from rotating so that the manual ring 20 (see FIG. 1) can be used to carry out the manual focus operation as well as the autofocus operation using the stepper motor 30. Specifically, when the manual ring 20 is manually rotated, the rollers 13a (see FIG. 2) are rotated, and the rotation of the rollers 13a serves to rotate the rotor 32 via the synchronization ring 31, which abuts the rollers 13a. If the rotation of the manual ring 20 rotates the rotor 32, it is difficult for the photographing user to make a delicate focus adjustment. To address the problem, the frictional force between the rotor 32 and the sliding ring 37 is adjusted in such a way that the rotation of the manual ring 20 transferred by the rollers 13a does not rotate the rotor 32. The frictional force can be delicately adjusted because the sliding ring 37 made of a fluororesin has a low coefficient of friction.

[Example of Autofocus Operation]

Figure 4A:
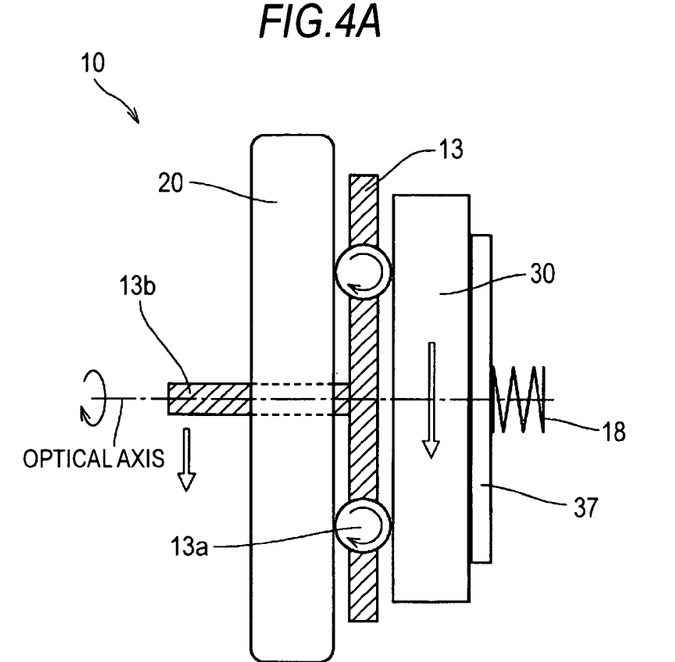
FIGS. 4A and 4B diagrammatically show an exemplary autofocus operation carried out in the exchangeable lens barrel (first embodiment) as a lens barrel according to one embodiment of the invention.
Figure 4B:
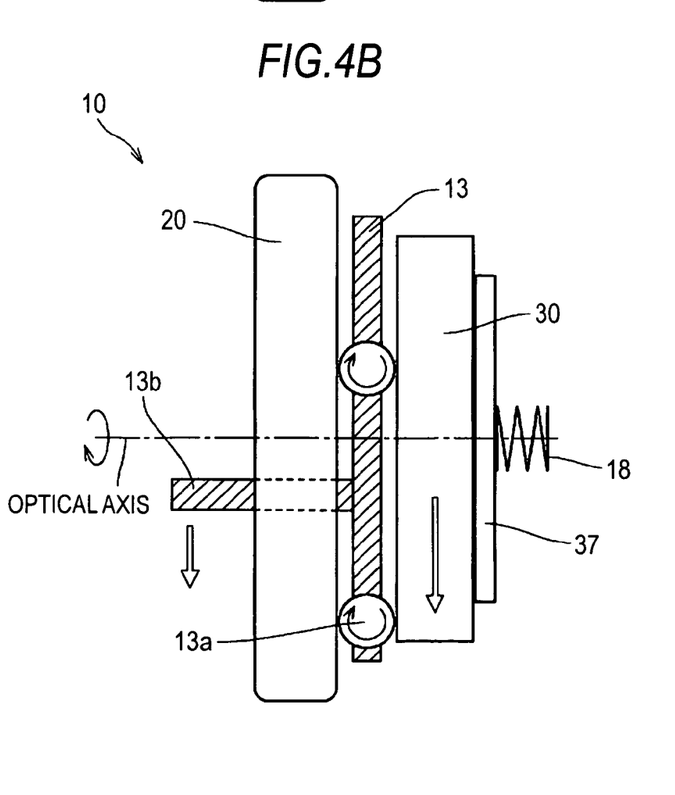

FIGS. 4A and 4B diagrammatically show an example of the autofocus operation carried out in the exchangeable lens barrel 10 (first embodiment) as a lens barrel according to an embodiment of the invention.

As shown in FIGS. 4A and 4B, the cylindrical rollers 13a, each of the rollers having an axis around which it rotates and which is perpendicular to the optical axis, are provided between the manual ring 20 and the stepper motor 30. The rollers 13a are rotated in synchronization with not only the rotation of the manual ring 20 but also the rotation of the stepper motor 30.

The differential ring 13, which is rotated around the optical axis as the rollers 13a are rotated, is provided between the manual ring 20 and the stepper motor 30. Further, the synchronization key 13b, which transfers the rotary motion of the differential ring 13 to the lens holding frame 12 (see FIG. 1), protrudes from the differential ring 13 through the manual ring 20. Moreover, the sliding ring 37, which is pressed by the pressurizing spring 18, is in surface contact with the end surface of the stepper motor 30 on the side that is opposite the differential ring 13, whereby a predetermined magnitude of frictional force acts on the stepper motor 30.

When the autofocus operation is carried out in the exchangeable lens barrel 10 in an initial state shown in FIG. 4A, pulse signals are transmitted to a drive circuit for driving the stepper motor 30. The stepper motor 30 is incrementally rotated by a predetermined angle around the optical axis in accordance with the number of pulse signals. The rotational torque produced by the rotating stepper motor 30 is transferred to the rollers 13a, each of which is rotated clockwise around the axis of rotation, which is perpendicular to the optical axis.

The differential ring 13 is rotated around the optical axis as the rollers 13a are rotated, as shown in FIG. 4B. The differential ring 13 then rotates the lens holding frame 12 (see FIG. 1) via the synchronization key 13b. In this process, the angle of rotation of the differential ring (indicated by the corresponding downward arrow shown in FIGS. 4A and 4B) is reduced to half the angle of rotation of the stepper motor 30 (indicated by the corresponding downward arrow shown in FIGS. 4A and 4B). The rotational torque produced by the stepper motor 30 is therefore doubled and transferred to the differential ring 13.

As a result, the exchangeable lens barrel 10 of the first embodiment, even when the inexpensive small stepper motor 30 is used, provides rotational torque necessary to rotate the lens holding frame 12. The coreless stepper motor 30 can therefore be disposed in a limited space in the exchangeable lens barrel 10. Further, since the rotational torque is transferred via the rollers 13a, no driving noise (gear noise) will be produced, and the stepper motor 30 will not produce driving-related unusual noise, unlike an ultrasonic motor. Moreover, driving the stepper motor 30, for example, by using a microstep driving method allows the stop position precision to be improved, and defining a rotational reference of the rotor 32 eliminates the need for a position sensor.

When the stepper motor 30 is driven and rotated, the rollers 13a are rotated, and the rotation of the rollers 13a serves to rotate the manual ring 20, which abuts the rollers 13a on the side that is opposite the stepper motor 30. However, the manual ring 20 is disposed on the outer side of the front barrel 15 (see FIG. 1), and an appropriate frictional force is produced between the manual ring 20 and the front barrel 15. The frictional force not only serves as adequate resistance when the manual ring 20 is manually rotated, but also prevents the rotation of the stepper motor 30 from rotating the manual ring 20 via the rollers 13a.

[Example of Manual Focus Operation]

Figure 5A:
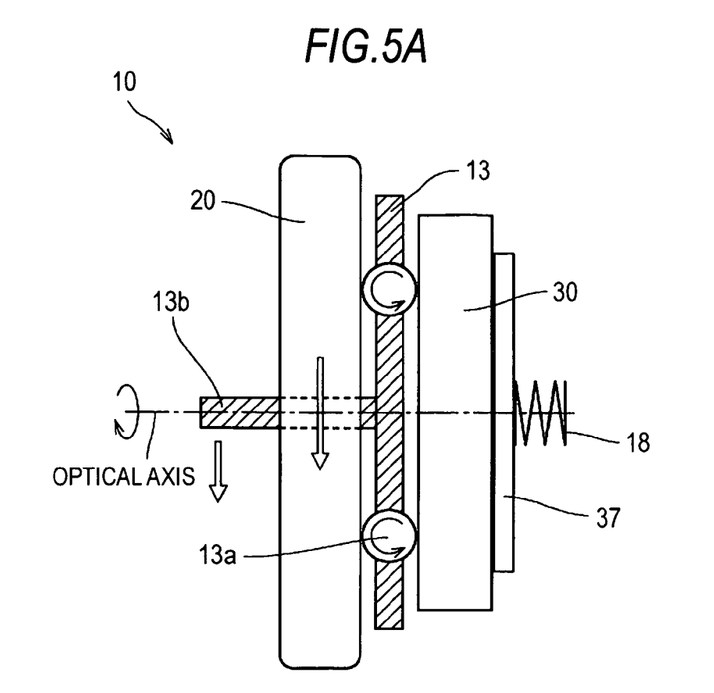
FIGS. 5A and 5B diagrammatically show an exemplary manual focus operation carried out in the exchangeable lens barrel (first embodiment) as a lens barrel according to one embodiment of the invention.
Figure 5B:
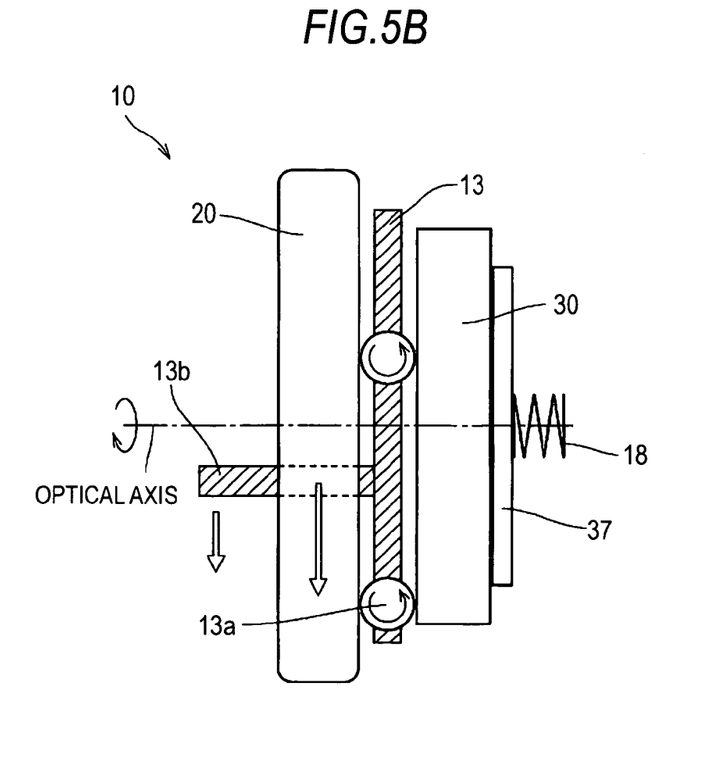

FIGS. 5A and 5B diagrammatically show an example of the manual focus operation carried out in the exchangeable lens barrel 10 (first embodiment) as a lens barrel according to an embodiment of the invention.

When the manual focus operation is carried out in the exchangeable lens barrel 10 in the initial state shown in FIG. 5A, the rotational torque produced by the manual ring 20 that is manually rotated is transferred to the rollers 13a. Each of the rollers 13a is therefore rotated counterclockwise around the axis of rotation, which is perpendicular to the optical axis.

The differential ring 13 is rotated around the optical axis as the rollers 13a are rotated, as shown in FIG. 5B. Furthermore, the differential ring 13 then rotates the lens holding frame 12 (see FIG. 1) via the synchronization key 13b. In this process, the angle of rotation of the differential ring 13 (indicated by the corresponding downward arrow shown in FIGS. 5A and 5B) is reduced to half the angle of rotation of the manual ring 20 (indicated by the corresponding downward arrow shown in FIGS. 5A and 5B). The photographing user can therefore make a delicate focus adjustment through the manual ring 20.

When the manual ring 20 is rotated, the rollers 13a are rotated, and the rotation of the rollers 13a serves to rotate the stepper motor 30, which abuts the rollers 13a on the side that is opposite the manual ring 20. If the rotation of the manual ring 20 rotates the stepper motor 30, it is difficult for the photographing user to make a delicate focus adjustment. However, the sliding ring 37, which is pressed by the pressurizing spring 18, is in surface contact with the stepper motor 30, and a predetermined magnitude of frictional force acts on the stepper motor 30. The frictional force is adjusted by the pressurizing spring 18 to a magnitude that prevents the stepper motor 30 from rotating even when the manual ring 20 is rotated.

Therefore, in the exchangeable lens barrel 10 of the first embodiment, the sliding ring 37 pressed by the pressurizing spring 18 does not allow the rotation of the manual ring 20 to rotate the stepper motor 30 via the rollers 13a. Therefore, in addition to the autofocus operation using the stepper motor 30, the photographing user can carry out the manual focus operation only by manually rotating the manual ring 20 without any special switching unit.

The sliding ring 37 pressed by the pressurizing spring 18 constantly exerts a predetermined magnitude of frictional force on the stepper motor 30. Therefore, after the autofocus operation is completed, the lens holding frame 12 (see FIG. 1) will not move due to the gravity or an impact even when the stepper motor 30 is not energized or the power consumption thereof is reduced (to 0 (W)), but the in-focus state is maintained.

2. Second Embodiment

[Example of Manual Focus Operation]

Figure 6A:
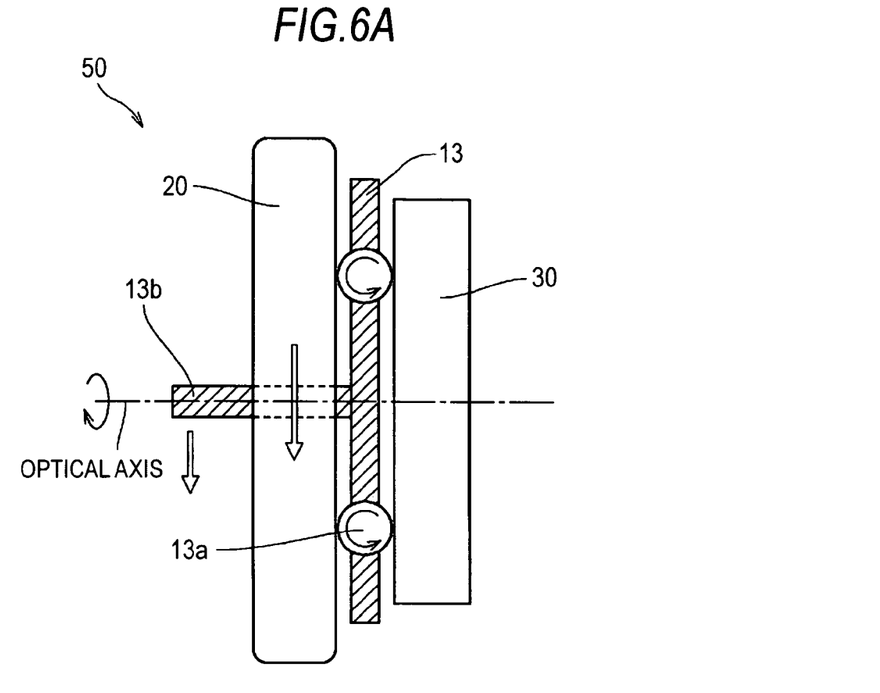
FIGS. 6A and 6B diagrammatically show an exemplary manual focus operation carried out in an exchangeable lens barrel (second embodiment) as a lens barrel according to one embodiment of the invention.
Figure 6B:
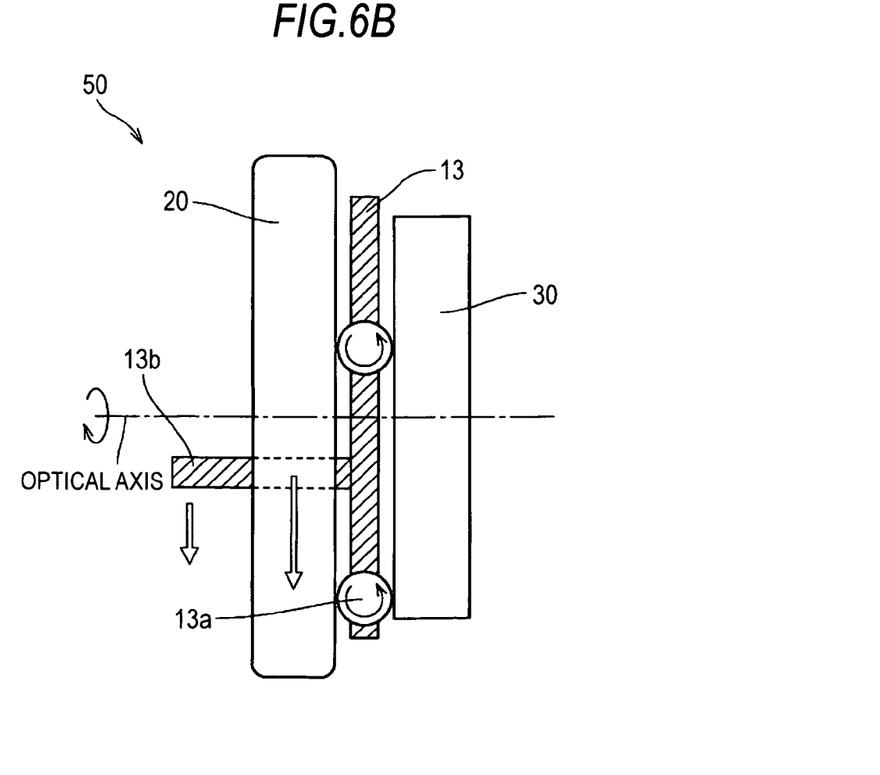

FIGS. 6A and 6B diagrammatically show an example of the manual focus operation carried out in an exchangeable lens barrel 50 (second embodiment) as a lens barrel according to an embodiment of the invention.

As shown in FIGS. 6A and 6B, the exchangeable lens barrel 50 of the second embodiment includes the same differential ring 13, rollers 13a, synchronization key 13b, manual ring 20, and stepper motor 30 as those in the exchangeable lens barrel 10 of the first embodiment shown in FIGS. 5A and 5B. The rollers 13a are rotated not only in synchronization with the rotation of the manual ring 20 but also in synchronization with the rotation of the stepper motor 30. The differential ring 13 is rotated as the rollers 13a are rotated, and the rotary motion of the differential ring 13 is transferred to the lens holding frame 12 (see FIG. 1) via the synchronization key 13b.

The exchangeable lens barrel 50 of the second embodiment shown in FIGS. 6A and 6B, however, differs from the exchangeable lens barrel 10 of the first embodiment shown in FIGS. 5A and 5B in that no sliding ring 37 that is in surface contact with the stepper motor 30 or no pressurizing spring 18 that presses the sliding ring 37 is provided. Therefore, no means for preventing the stepper motor 30 from rotating is provided.

When the manual focus operation is carried out in the thus configured exchangeable lens barrel 50 in an initial state shown in FIG. 6A, the rotational torque produced by the manual ring 20 that is manually rotated is transferred to the rollers 13a. Each of the rollers 13a is therefore rotated counterclockwise around the axis of rotation, which is perpendicular to the optical axis. The differential ring 13 is rotated around the optical axis as the rollers 13a are rotated, as shown in FIG. 6B. The differential ring 13 then rotates the lens holding frame 12 (see FIG. 1) via the synchronization key 13b. In this process, the angle of rotation of the differential ring 13 (indicated by the corresponding downward arrow shown in FIGS. 6A and 6B) is reduced to half the angle of rotation of the manual ring 20 (indicated by the corresponding downward arrow shown in FIGS. 6A and 6B).

When the manual ring 20 is rotated, the rollers 13a are rotated, and the rotation of the rollers 13a serves to rotate the stepper motor 30, which abuts the rollers 13a on the side that is opposite the manual ring 20. In the exchangeable lens barrel 50 of the second embodiment, it is conceivable that the rotation of the manual ring 20 may disadvantageously rotate the stepper motor 30 because no means for preventing the stepper motor 30 from rotating is provided.

In the exchangeable lens barrel 50 of the second embodiment, however, the stepper motor 30 is driven in a weakly-energized state that does not allow the rotation of the manual ring 20 to rotate the stepper motor 30 in order to prevent the stepper motor 30 from rotating. Alternatively, when the internal frictional force in the stepper motor 30 is adjusted in such a way that the rotation of the manual ring 20 does not rotate the stepper motor 30, the stepper motor 30 will not be rotated even when it is not energized.

Therefore, in the exchangeable lens barrel 50 of the second embodiment as well, the rotation of the manual ring 20 will not rotate the stepper motor 30 via the rollers 32a. The photographing user can therefore make a delicate focus adjustment by carrying out the manual focus operation through the manual ring 20. Further, the lens holding frame 12 (see FIG. 1) will not move due to the gravity or an impact, whereby the in-focus state is maintained. On the other hand, the autofocus operation is carried out by driving and rotating the stepper motor 30.

While the embodiments of the invention have been described above, the invention is not limited thereto. For example, the following variety of changes can be made:

(1) In the embodiments described above, as the motion conversion means for converting the rotary motion of the lens holding frame 12 into the reciprocating motion along the optical axis of the lens 11, the helicoid 14a is formed in the cylindrical surface of the fixed barrel 14 and the cam pin 12a protruding from the outer circumferential surface of the lens holding frame 12 is provided. The motion conversion means is not limited thereto. For example, the rotary motion of the lens holding frame may be converted into the reciprocating motion by forming a female thread on the inner circumferential surface of the fixed barrel and forming a male thread on the outer circumferential surface of the lens holding frame.

(2) In the embodiments described above, as the motor rotation preventing means for preventing the stepper motor 30 from rotating when the rollers 32a transfer the rotation of the manual ring 20, the sliding ring 37 is provided. The sliding ring 37 is brought into surface contact with the end surface of the rotor 32 on the side that is opposite the differential ring 13, and the resultant frictional force between the rotor 32 and the sliding ring 37 prevents the stepper motor 30 from rotating. The motor rotation prevention means is not limited thereto. For example, the motor rotation prevention means may be a locking mechanism that is, for example, moved in synchronization with the rotation of the manual ring 20 and engages the rotor to prevent the stepper motor from rotating.

(3) In the embodiments described above, the autofocus function and the manual focus function are achieved by using the lens 11 as the focus lens. Alternatively, an automatic zoom function and a manual zoom function may be achieved by using a zoom lens. Further, while the above embodiments have been described with reference to the exchangeable lens barrel used in an exchangeable lens for a digital single lens reflex camera, the invention is also applicable to a fixed lens barrel provided in a digital still camera or any other similar camera.

It should be understood by those skilled in the art that various modifications, combinations, sub-combinations and alterations may occur depending on design requirements and other factors insofar as they are within the scope of the appended claims or the equivalents thereof.

What is claimed is:

1. A lens barrel comprising:
a lens holding frame holding a lens;
a barrel body housing the lens holding frame;
motion conversion means for converting rotary motion of the lens holding frame into reciprocating motion along the optical axis of the lens, the motion conversion means provided between the lens holding frame and the barrel body;
a manual ring provided on the outer side of the barrel body and rotating around the optical axis of the lens when manually rotated;
a coreless stepper motor provided on the outer side of the barrel body and rotating around the optical axis of the lens;
rollers provided between the manual ring and the stepper motor, the rollers rotating not only in synchronization with the rotation of the manual ring but also in synchronization with the rotation of the stepper motor;
motor rotation preventing means for preventing the stepper motor from rotating when the rollers transfer the rotation of the manual ring;
an intermediate ring rotating around the optical axis of the lens as the rollers rotate; and
a transfer unit transferring the rotary motion of the intermediate ring to the lens holding frame.

2. The lens barrel according to claim 1,
wherein the motor rotation preventing means is a sliding ring provided on the outer side of the barrel body and being in surface contact with the rotor of the stepper motor.

3. The lens barrel according to claim 1,
wherein the motor rotation preventing means is a sliding ring provided on the outer side of the barrel body and being in surface contact with the rotor of the stepper motor, and
the barrel body includes
a pressurizing spring pressing the sliding ring against the rotor, and
a pressure adjusting ring that allows the pressing force of the pressurizing spring to be adjusted.

4. The lens barrel according to claim 1,
wherein the barrel body can be attached and detached to and from an imaging apparatus that captures a subject image incident through the lens.

5. The lens barrel according to claim 1,
wherein the stepper motor includes a rotary bearing between the rotor and the stator, and the rotary bearing keeps the distance between a magnet and a coil in the stepper motor constant.

6. A lens barrel comprising:
a lens holding frame holding a lens;
a barrel body housing the lens holding frame;
motion conversion means for converting rotary motion of the lens holding frame into reciprocating motion along the optical axis of the lens, the motion conversion means provided between the lens holding frame and the barrel body;
a manual ring provided on the outer side of the barrel body and rotating around the optical axis of the lens when manually rotated;
a coreless stepper motor provided on the outer side of the barrel body and rotating around the optical axis of the lens;
rollers provided between the manual ring and the stepper motor, the rollers rotating not only in synchronization with the rotation of the manual ring but also in synchronization with the rotation of the stepper motor;
an intermediate ring rotating around the optical axis of the lens as the rollers rotate; and
a transfer unit transferring the rotary motion of the intermediate ring to the lens holding frame.

7. An imaging apparatus comprising:
a lens capturing an image;
an imaging device disposed in the optical axis of the lens;
a lens holding frame holding the lens;
a barrel body housing the lens holding frame;
motion conversion means for converting rotary motion of the lens holding frame into reciprocating motion along the optical axis of the lens, the motion conversion means provided between the lens holding frame and the barrel body;
a manual ring provided on the outer side of the barrel body and rotating around the optical axis of the lens when manually rotated;
a coreless stepper motor provided on the outer side of the barrel body and rotating around the optical axis of the lens;
rollers provided between the manual ring and the stepper motor, the rollers rotating not only in synchronization with the rotation of the manual ring but also in synchronization with the rotation of the stepper motor;
motor rotation preventing means for preventing the stepper motor from rotating when the rollers transfer the rotation of the manual ring;
an intermediate ring rotating around the optical axis of the lens as the rollers rotate; and
a transfer unit transferring the rotary motion of the intermediate ring to the lens holding frame.

8. A lens barrel comprising:
a lens holding frame holding a lens;
a barrel body housing the lens holding frame;
a motion conversion unit configured to convert rotary motion of the lens holding frame into reciprocating motion along the optical axis of the lens, the motion conversion unit provided between the lens holding frame and the barrel body;
a manual ring provided on the outer side of the barrel body and rotating around the optical axis of the lens when manually rotated;
a coreless stepper motor provided on the outer side of the barrel body and rotating around the optical axis of the lens;
rollers provided between the manual ring and the stepper motor, the rollers rotating not only in synchronization with the rotation of the manual ring but also in synchronization with the rotation of the stepper motor;

a motor rotation preventing unit configured to prevent the stepper motor from rotating when the rollers transfer the rotation of the manual ring;

an intermediate ring rotating around the optical axis of the lens as the rollers rotate; and a transfer unit transferring the rotary motion of the intermediate ring to the lens holding frame.

9. A lens barrel comprising:

a lens holding frame holding a lens;

a barrel body housing the lens holding frame;

a motion conversion unit configured to convert rotary motion of the lens holding frame into reciprocating motion along the optical axis of the lens, the motion conversion unit provided between the lens holding frame and the barrel body;

a manual ring provided on the outer side of the barrel body and rotating around the optical axis of the lens when manually rotated;

a coreless stepper motor provided on the outer side of the barrel body and rotating around the optical axis of the lens;

rollers provided between the manual ring and the stepper motor, the rollers rotating not only in synchronization with the rotation of the manual ring but also in synchronization with the rotation of the stepper motor;

an intermediate ring rotating around the optical axis of the lens as the rollers rotate; and a transfer unit transferring the rotary motion of the intermediate ring to the lens holding frame.

10. An imaging apparatus comprising:

a lens capturing an image;

an imaging device disposed in the optical axis of the lens;

a lens holding frame holding the lens;

a barrel body housing the lens holding frame;

a motion conversion unit configured to convert rotary motion of the lens holding frame into reciprocating motion along the optical axis of the lens, the motion conversion unit provided between the lens holding frame and the barrel body;

a manual ring provided on the outer side of the barrel body and rotating around the optical axis of the lens when manually rotated;

a coreless stepper motor provided on the outer side of the barrel body and rotating around the optical axis of the lens;

rollers provided between the manual ring and the stepper motor, the rollers rotating not only in synchronization with the rotation of the manual ring but also in synchronization with the rotation of the stepper motor;

a motor rotation preventing unit configured to prevent the stepper motor from rotating when the rollers transfer the rotation of the manual ring;

an intermediate ring rotating around the optical axis of the lens as the rollers rotate; and a transfer unit transferring the rotary motion of the intermediate ring to the lens holding frame.

* * * * *